APPARATUS FOR DETECTING BROKEN YARN IN SYNTHETIC FIBER SPINNING

Original Filed April 1, 1969

United States Patent

Re. 28,430

Reissued May 27, 1975

28,430

APPARATUS FOR DETECTING BROKEN YARN IN SYNTHETIC FIBER SPINNING

Eitaro Mukai, Yasuhiro Murase, Mitsuru Kusama, and Mitsuru Yamasaki, Matsuyama, and Takayuki Takasago, Tokyo, and Tatsumi Tanabe, Matsuyama, Japan, assignors to Teijin Ltd., Osaka, Japan Original No. 3,618,168, dated Nov. 9, 1971, Ser. No. 811,979, Apr. 1, 1969. Application for reissue Oct. 31, 1973, Ser. No. 411,384

Claims priority, application Japan, Apr. 9, 1968, 43/23,858

Int. Cl. D01d 7/00

U.S. Cl. 425—169 2 Claims

Matter enclosed in heavy brackets [ ] appears in the original patent but forms no part of this reissue specification; matter printed in italics indicates the additions made by reissue.

ABSTRACT OF THE DISCLOSURE

Apparatus for detecting breakage of continuous filament yarn including a yarn [receiving] *collecting* device disposed between a spinneret and a guide roller, and a photoelectric detector disposed adjacent the yarn [receiving] *collecting* device to detect yarn accumulated thereon. The guide roller has a stopper rod extending from a flange to stop rotation of the guide roller when yarn builds up on the guide roller to contact the stopper rod. Broken yarn upstream of the [guide of the] guide roller is accumulated on the yarn [receiving] *collecting* device and detected by the photoelectric detector, and breakage of yarn downstream of the guide roller builds up on the guide roller to contact the stopper rod and stop rotation of the guide roller thereby releasing tension on yarn upstream of the guide roller to permit the yarn to accumulate on the yarn [receiving] *collecting* device and be detected by the photoelectric detector.

This invention has as its object the early discovery of broken yarn during a spinning operation and the minimization of waste yarn. As a result of this invention, labor required for detecting broken yarn is reduced.

Generally speaking, synthetic fibers are produced by the extrusion of polymer melt or solution, as the case may be, from the orifices in a spinneret and the winding-up of polymer streams while being solidified or by the continuous movement of the streams to subsequent processes such as drawing, etc. while they are pulled with rollers.

In such a spinning process, when the yarn is broken during the spinning operation, the filament yarn driven out from the orifices falls down by gravity, without being pulled or received, or it wraps itself around the rollers, resulting in waste yarn. Consequently it is desirable to minimize this waste yarn by detecting the breakage of yarn as soon as possible, halting the polymer supply, suspending the extrusion of yarn from the spinneret or by taking other measures to restore normal spinning condition.

In order to discover the broken yarn during the spinning operation, operators have hitherto watched with vigilance the spinning, while moving around the spinning machine. Thus, due to the delay in detecting the breakage of yarn, a great amount of waste yarn has occurred. As spinning machines and spinning positions increase in number, the number of operators must be increased, thereby increasing labor expenses.

The present invention eliminates such waste yarn and high labor expenses by utilizing a photoelectric detecting device. It is known to place a substance halfway between a light emissive part and a light receiving part facing each other and to recognize the presence of the substance as variations in quantities of received light in the light receiving part.

It is an object of the present invention to adapt a photoelectric device for detecting broken yarn and further to provide a yarn [receiving] *collecting* device in cooperation with the photoelectric detecting device to permit an accumulation of slack yarn on the yarn [receiving] *collecting* device to be detected.

Another object of this invention is to immediately detect broken yarn and minimize the amount of waste yarn by disposing a yarn [receiving] *collecting* device to accumulate the broken yarn and detecting the accumulation of yarn by means of a photoelectric detector. Further, another object of the present invention is to reduce labor required to detect broken yarn by automatic early discovery of the broken yarn.

The apparatus of this invention will be described below with reference to the accompanying drawings.

Figure 1:
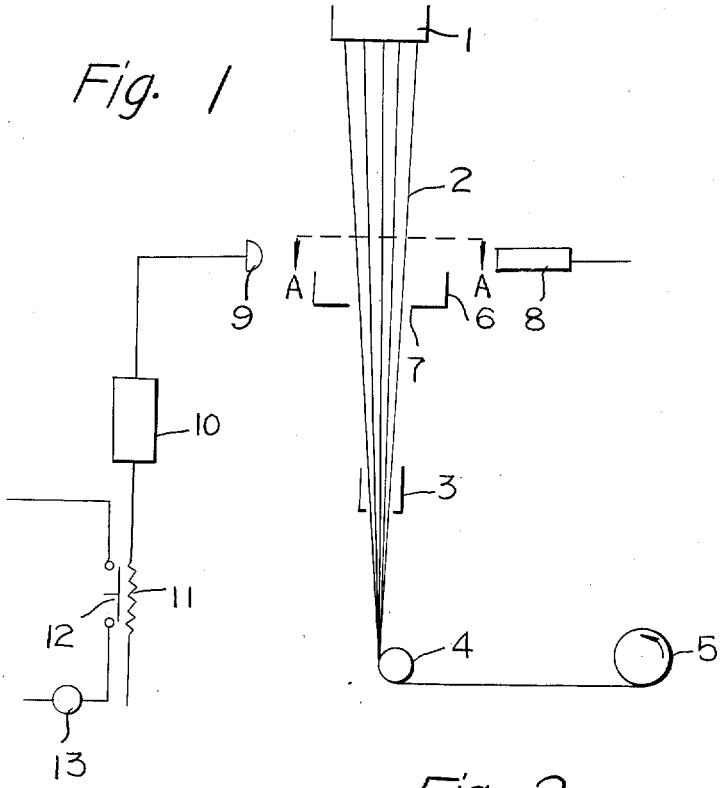
FIG. 1 is a schematic diagram of an embodiment of the present invention.

In FIG. 1, numerals 1 to 5 [designates] *designate* an ordinary synthetic fiber spinning process. A number of filaments 2 extruded from a spinneret 1 having a number of orifices are gradually collected and lubricated while making contact with oiling roller 3, and wound onto winder 5 [.] *or received by any suitable tensioning device after* passing by a guide roller 4. In the above-mentioned process, the breakage of yarn occurs in two *paths or* stages: the first stage between spinneret 1 and guide roller 4 and the second stage between guide roller 4 and winder 5. When the breakage of yarn occurs at the first stage, the broken yarn accumulates on the floor in [a] *an* extremely chaotic state. When the breakage of yarn occurs at the second stage the broken yarn wraps itself around guide roller 4. For either case of breakage, the broken yarn is subjected to accumulation at one place and a photoelectric detecting device is disposed near that place to detect the broken yarn.

As shown in FIG. 1, a yarn [receiving] *collecting* device 6 is disposed between spinneret 1 and guide roller 4. This yarn storage device is most important. The base of yarn [receiving] *collecting* device 6 has an opening 7, which running filaments 2 pass through when the spinning operation is normal. If breakage of filaments occurs at the first stage, they will be caught by yarn [receiving] *collecting* device 6 adjacent opening 7 because of the lack of drawing tension on the broken yarn and the broken yarn will accumulate on yarn [receiving] *collecting* device 6. That is, when filament breakage occurs between spinneret 1 and guide roller 4, the broken filament or filaments will not be subject to drawing tension and will deviate from the normal path of travel, which deviation can be enanced by subjecting the filaments to a flow of air, as shown, for example by British Pat. 691,069, the air flow being adjacent yarn [receiving] *collecting* device 6. The loose, broken filaments will, therefore, be caught on the *collecting* surface of yarn [receiving] *collecting* device 6 around opening 7, and some of the filaments will span opening 7 to increase the accumulation of filaments on the yarn [receiving] *collecting* device.

Figure 2:
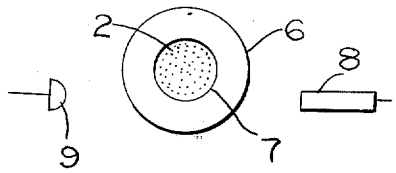
FIG. 2 is a plan view of FIG. 1 taken along line A–A′.
Figure 3:
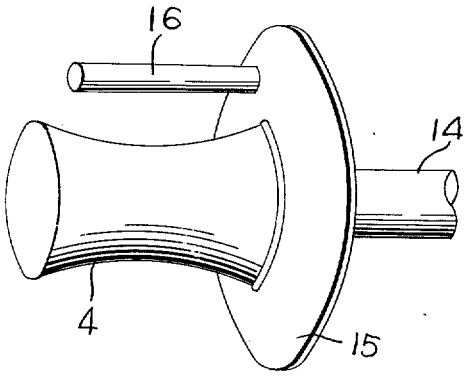
FIG. 3 is a perspective view of a guide roller employed in this invention.

As a countermeasure against the breakage of yarn at the second stage, which yarn tends to wrap itself around the guide roller 4, the guide roller is constructed as shown in FIG. 3. Guide roller 4 is rotatably attached to fixed shaft 14, and the fixed shaft 14 is provided with a flange 15 having a stopper 16 extending transversely therefrom. It is desired to keep the distance between roller 4 and stopper 16 as small as the operation will allow. If the breakage of yarns occurs at the second stage; that is, downstream of guide roller 4, the broken yarn still in contact with guide roller 4 wraps itself around the roller 4. As long as guide roller 4 rotates, the broken yarn keeps wrapping itself around the roller, but the guide roller instantly stops rotating when the build up of the filaments on the guide roller makes contact with the stopper 16 fixed to the roller if the roller is freely rotatable. However, guide roller 4 may be positively driven, and in this case, when the yarn is broken, wraps itself around guide roller 4, and makes contact with stopper 16, the load of the motor which drives the roller rapidly increases. The increased load may operate a thermal-relay to stop the motor driving the roller. In either of the cases, when the yarn wraps itself around the roller, the roller stops rotating instantly; therefore, the filaments discharged from spinneret 1 losing their winding tension to dangle freely and immediately accumulate on yarn [receiving] *collecting* device 6. As mentioned above, it is clearly understood that in either of the first and second stages, when the broken yarn occurs, the continuously discharged yarn is instantly stored on yarn [receiving] *collecting* device 6. In the present invention, yarn [receiving] *collecting* device 6 provides an important function and a photoelectric detecting device is utilized for the instant discovery of broken yarn which accumulates on yarn [receiving] *collecting* device 6. As shown in FIGS. 1 and 2, a light emissive part 8 and a light receiving part 9 are disposed on either side of the yarn [receiving] *collecting* device so that, as shown in FIG. 2, a line linking light emissive part 8 and light receiving part 9, so long as it passes through or above yarn [receiving] *collecting* device 6, may slightly deviate from the normal path of movement of yarn 2. In the embodiment of this invention, a pair of light emissive and receiving parts 8 and 9 are illustrated; however, a plurality of photoelectric detectors may be disposed around yarn [receiving] *collecting* device 6.

Light receiving part 9 includes a photo transistor operative to convert in to an electric current the light received from light emissive part 8, and the current is amplified by an amplifier 10 to energize a relay winding 11. During normal spinning operation, there are only the running yarn and the yarn [receiving] *collecting* device, which is made of transparent material (later discussed), to intercept the space between light emissive part 8 and light receiving part 9; and, accordingly, a specified electric current is supplied by device 9 to energize winding 11 and open switch 12. When the yarn is broken and begins to accumulate on yarn [receiving] *collecting* device 6, the space between light emissive part 8 and light receiving part 9 is intercepted, the amount of light [receiving] *received by* light receiving part 9 decreases, relay 11 is de-energized, switch 12 is closed, and a buzzer 13 is energized. An alarm light may be installed instead of a buzzer, or the circuit including switch 12 may be connected to the drive sources of the spinning or winding machines so that when the broken yarn occurs, the spinning or winding machines stop instantly. If a number of buzzers and alarm lights for spinning positions are positioned at one place, such as on a control panel, one operator alone can control many spinning operations, and there is entirely no need for an operator to make rounds and watch the spinning.

In operation, as soon as breakage of yarn occurs between spinneret 1 and guide roller 4, the discharged yarn accumulates on yarn [receiving] *collecting* device 6, and the broken yarn is detected by means of the photoelectric detector.

When breakage of yarn occurs downstream of guide roller 4, the yarn wraps itself around guide roller 4 as the roller rotates. If the accumulation of yarn on roller 4 increases to contact stopper 16, the roller 4 stops rotating, yarn tension disappears, and the running yarn accumulates around hole 7 of yarn [receiving] *collecting* device 6 and is detected by the photoelectric detector. In embodying the present invention, it is necessary to construct yarn [receiving] *collecting* device 6 of wire nets, metal plates, plastics and so on to prevent the accumulated yarn from falling off. The sides of said yarn [receiving] *collecting* device 6 are made of wire nets or lattices or transparent plastics. As an embodiment of the present invention, a photoelectric detector with a pair of light emissive and light receiving parts facing each other for one spinning position has been described as above but a pair of photoelectric detectors may be used so as to cover a plurality of spinning positions. According to this invention, it has become feasible to quickly detect broken yarn occurring during the spinning operation and to greatly reduce the amount of waste yarn. Further, with the reduced number of operators the operation can be smoothly continued.

What is claimed is:

1. Apparatus for detecting breakage of yarn in a spinning machine including a spinneret, a guide roller receiving yarn from the spinneret along a first path of travel, and [a winder] *tensioning means* receiving yarn from the guide roller along a second path of travel, said apparatus comprising yarn [receiving] *collecting* means disposed along said first path of travel, said yarn [receiving] *collecting* means having an opening through which said yarn passes and a surface surrounding said opening for collecting yarn; and photoelectric detection means disposed adjacent said yarn collecting means and including light emitting means disposed on one side of said yarn [receiving] *collecting* means, light receiving means disposed on the other side of said yarn [receiving] *collecting* means, and means connected with said light receiving means to indicate breakage of yarn when yarn collected on said surface interferes with light received by said light receiving means from said light emitting means.

2. The apparatus as recited in claim 1 wherein said guide roller includes a stopper rod spaced from the periphery thereof whereby breakage of yarn along said second path of travel causes said yarn to wind around said guide roller and contact said stopper rod to prevent rotation of said guide roller and release tension from said yarn along said first path of travel such that said yarn accumulates on said surface of said yarn [receiving] *collecting* means and is detected by said photoelectric detecting means.

References Cited

The following references, cited by the Examiner, are of record in the patented file of this patent or the original patent.

UNITED STATES PATENTS

| | | | |
|---|---|---|---|
| Re. 22,240 | 12/1942 | Kline | 264—40 |
| 3,341,888 | 9/1967 | Bridge et al. | 264—40 |
| 3,401,267 | 9/1968 | Engle et al. | 356—238 |
| 3,499,064 | 3/1970 | Tsuboshima et al. | 264—40 |

FOREIGN PATENTS

| | | | |
|---|---|---|---|
| 691,069 | 5/1953 | Great Britain | 356—238 |

ROBERT D. BALDWIN, Primary Examiner